May 19, 1936.    C. J. KINZIE ET AL    2,040,854
TITANIUM COMPOUND AND METHOD OF MAKING SAME
Filed July 9, 1934    2 Sheets-Sheet 1

INVENTORS:
CHARLES J. KINZIE
DONALD S. HAKE
BY
ATTORNEY

May 19, 1936. C. J. KINZIE ET AL 2,040,854
TITANIUM COMPOUND AND METHOD OF MAKING SAME
Filed July 9, 1934  2 Sheets-Sheet 2

INVENTOR
CHARLES J. KINZIE
DONALD S. HAKE
BY
ATTORNEY

Patented May 19, 1936

2,040,854

UNITED STATES PATENT OFFICE 2,040,854

TITANIUM COMPOUND AND METHOD OF MAKING SAME

Charles J. Kinzie and Donald S. Hake, Niagara Falls, N. Y., assignors to The Titanium Alloy Manufacturing Company, New York, N. Y., a corporation of Maine.

Application July 9, 1934, Serial No. 734,320

19 Claims. (Cl. 23—203)

Our invention relates to the production of novel compounds of titanium in the electric resistance furnace as will be hereinafter described.

During the course of our researches relative to action of mixtures of rutile or titanium oxide with carbon at the high temperature encountered in electrical resistance furnace using graphite as resistor, we discovered what we believe is a new compound of titanium which we have called titanium carboxide. This new titanium compound we have produced by heating a mixture of rutile or titanium oxide with carbon to a suitable temperature under conditions which we will later more specifically describe under the following examples. We believe the compound to have the formula $Ti_2OC_2$, although we are not certain as to the accuracy of such chemical formula. Our new product as formed is a fairly coherent spongy mass that is black in color.

Such new titanium compound is readily reacted with chemical agents, and thus forms a convenient source of titanium for various purposes. For instance, it is readily decomposed by $H_2SO_4$ to yield titanium sulphate. Of special interest is the ease and rapidity with which this compound reacts with chlorine gas to form titanium tetrachloride ($TiCl_4$), and in this connection $TiCl_4$ is more readily and conveniently produced from our new compound than is possible by use of titanium carbide (TiC) or titanium cyanonitride (TiCN).

The following examples will serve to illustrate how our new compound may be made.

In practicing our invention as shown in the accompanying drawings to illustrate our methods, we build up a hearth of suitable material, preferably of common firebrick, to serve as a supporting base for the furnace and its charge, the base having side and end walls to retain the charge. Through each of the end walls there is a suitable opening for the placing of the graphite electrode, while all or part of the side wall of the furnace is built up of loose bricks to allow the free escape of evolved gases, and to also allow dumping of the insulating material used around the charge. The bottom of the furnace is preferably supported on piers to allow ample space for air to circulate, and the bottom should not be too tight, only tight enough to retain charge insulation. There should be cracks or small openings in the bottom to allow the ready escape of evolved gases.

Of the drawings showing a type of electric resistance furnace which we prefer to use, Fig. 1 is a sectional elevation of such furnace;

*Example A.*—The following complete example will serve to show how our methods may be used to produce our new titanium compound. The furnace as shown in the accompanying drawings was loaded in the following manner:

An insulating mix is first prepared by mixing the following materials:

| | Parts by weight |
|---|---|
| Green petroleum coke | 37 |
| Silica sand | 55 |
| Wood sawdust | 8 |
| | 100 |

This mixture is charged upon the hearth of the furnace to a depth of about ten inches and leveled off and in center over an area of about fifteen inches by six inches a piece of thin tough paper was placed.

The graphite electrodes consist preferably of round one inch by twenty-six inch long pieces, one through each end wall the exterior ends being suitably connected to the source of current, while the ends within the furnace are brought to within twenty-four inches of each other, leaving this twenty-four inch space for the placing of granular graphite resistor. At each end of round one inch graphite electrodes is a four inch by four inch by one inch block of graphite to confine the zones of various materials.

Figure 1:
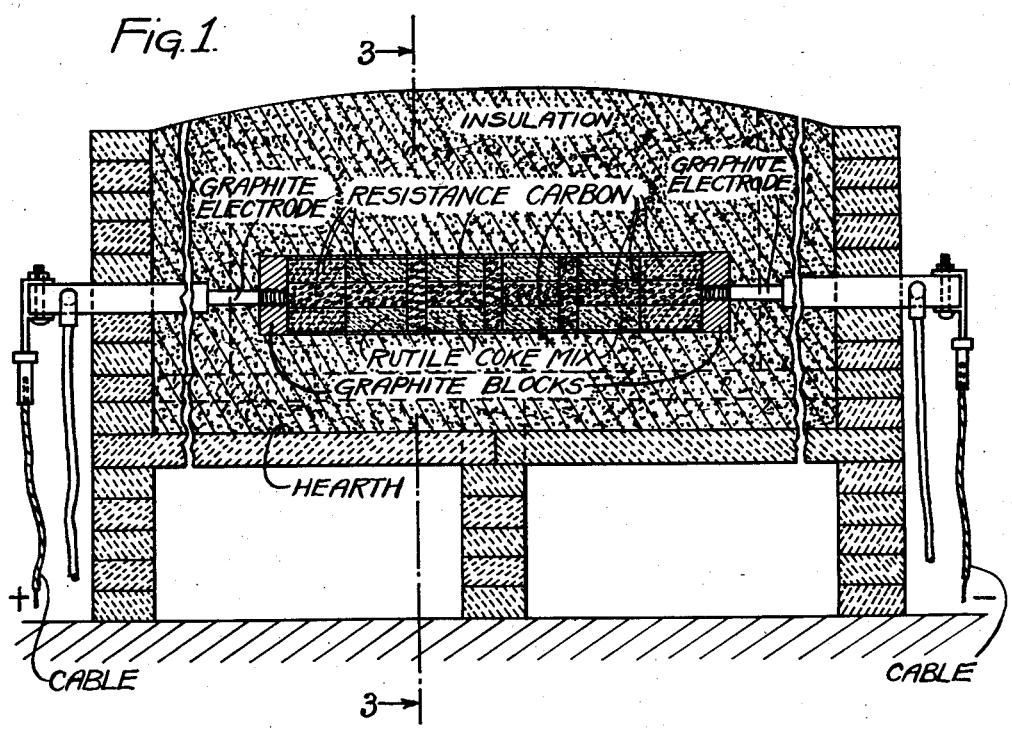
Figure 2:
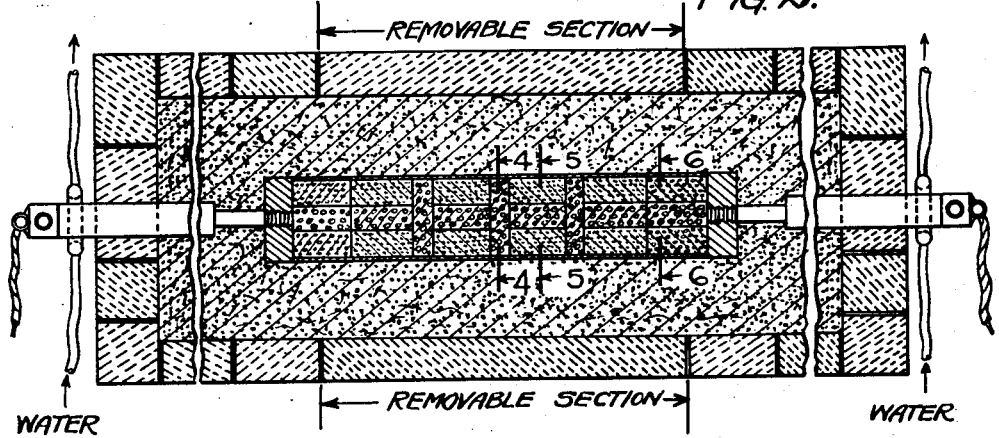
Fig. 2 is a horizontal section of Fig. 1 taken just above the electrodes.

Outside the furnace the ends of the graphite electrodes may be cooled by passing a current of water through them as shown in Figs. 1 and 2.

A charge was made by mixing rutile, petroleum coke and sawdust in approximately the following proportions:

|  | Per cent |
|---|---|
| Rutile —20 mesh | 62.14 |
| Petroleum coke —⅛ inch mesh | 37.59 |
| Sawdust —⅛ inch mesh | 0.27 |
|  | 100.00 |

The rutile use was approximately of the following composition:

|  | Per cent |
|---|---|
| Titanium (calculated as $TiO_2$) | 97.6 |
| Iron (calculated as $Fe_2O_3$) | 2.20 |
| Silicon (calculated as $SiO_2$) | 0.20 |
|  | 100.00 |

Figure 3:
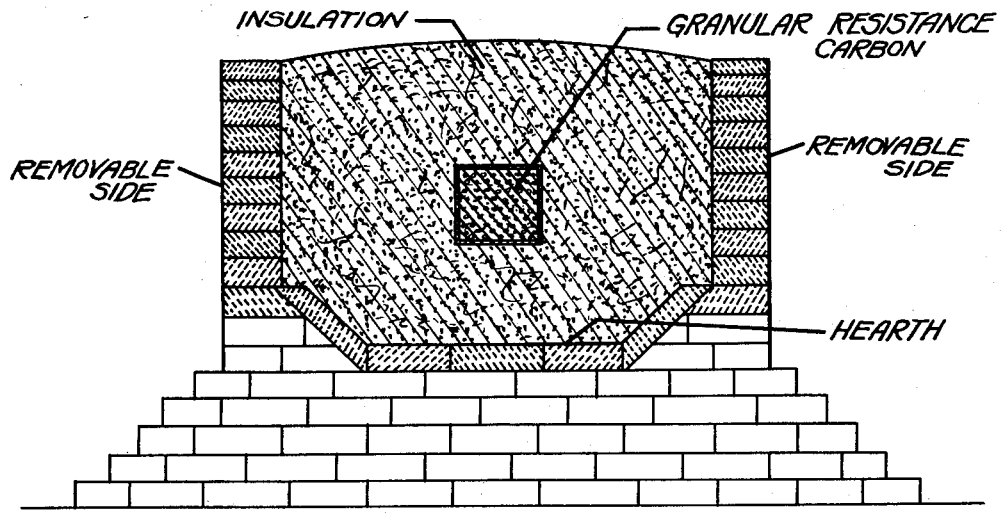
Fig. 3 is a section taken on the line 3—3 of Fig. 1.
Figure 4:
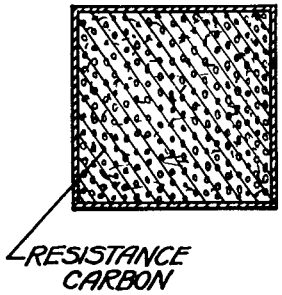
Fig. 4 is an enlarged section on the line 4—4 of Fig. 2.
Figure 5:
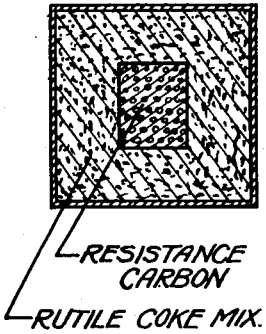
Fig. 5 is an enlarged section on the line 5—5 of Fig. 2.
Figure 6:
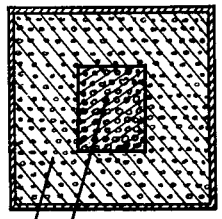
Fig. 6 is an enlarged section on the line 6—6 of Fig. 2.

This mixed charge was loaded as shown in Figs. 1–3 with the finer granular resistance carbon in the outer zone (Fig. 6) of approximate size of −20 mesh to +60 mesh, while the coarser granular resistance carbon in alinement between the electrodes and forming the sub-divisions (Fig. 4) between the zones of the rutile coke mix is of approximate size of ⅛ inch mesh to +20 mesh. Fig. 5 shows the rutile coke mix surrounding the coarser resistance carbon, such rutile coke mix being itself surrounded by a thin layer of —⅛ inch petroleum coke as shown.

The loading was preferably accomplished by first positioning thin metal sheets and then placing the various materials in their proper locations as shown, after which these metal sheets (not shown) are withdrawn. As shown in Figs. 1–3, the whole charge is covered with the insulation mix of the composition hereinbefore set forth at the bottom, sides, top and ends with approximately twelve inch zones.

The source of power for this example was a laboratory 220 volt —20 kva. single phase power transformer. A voltmeter and ammeter were connected and used to measure terminal voltage and secondary current. The power was turned on and the run was of 2½ hours' duration, and the load expressed in amperes was increased from 280 amperes to maximum of 600 amperes.

As the run progressed, the carbon monoxide gas evolved was ignited at various points at the sides, ends and bottom of the furnace. The exterior of the furnace bottom hearth, side walls, or top of the insulating mix were never much above room temperature, since the warmth at these points was mainly the result of the burning of carbon monoxide or other gases purposely ignited from the outside so as to convert same into harmless gases.

The power was turned off when the reactions appeared to be over as indicated by the practical stoppage of gas evolution. The furnace was left to cool for 72 hours, and then the insulating mix was removed. The four zones or sections formerly occupied by the "rutile coke mix" (Figs. 1 and 2) contained blocks of black sintered material which we found contained the following constituents as determined by analysis:

|  | Per cent |
|---|---|
| Titanium (calculated as Ti) | 67.20 |
| Carbon (calculated as C) | 21.35 |
| Iron (calculated as Fe) | 3.88 |
| Silicon (calculated as Si) | 0.46 |
| Balance (mainly oxygen) | 7.11 |
|  | 100.00 |

The material appeared essentially amorphous and had no crystalline structure; it had the appearance of foundry coke under the low power microscope. The color was bluish black and masses were friable with substantial decomposition of the charge but with no evidence of fusion present.

We believe that what probably occurs is that at the high temperature involved, the rutile melts and is absorbed by the coke which reacts to form the titanium carboxide which evidently has a melting point much higher than rutile. No carborundum formation occurred except possibly a few crystals in the charge itself, since the temperature adjacent to charge was not high enough to form SiC in the insulating mix.

Both the iron and silicon in the charge remained with the titanium in the sintered product. Evidently, therefore, the temperature of formation of our new titanium product is below 2200° C., and probably between 1700° and 2200° C.

*Example B.*—The details of loading operation, etc. were the same as in Example A, but this Example B differs from Example A to the extent that pure titanium oxide was used in place of rutile.

The titanium oxide of commerce is very bulky, and in order to permit of suitable furnace load it was first calcined at about 1400° C. to obtain a dense semi-vitrified mass which has approximately the following composition:

|  | Per cent |
|---|---|
| $TiO_2$ | 99.50 |
| $Fe_2O_3$ | 0.10 |
| $SiO_2$ | 0.10 |
| Balance | 0.30 |
|  | 100.00 |

This material was crushed and sized and charge made up containing

|  | Per cent |
|---|---|
| Sintered pure $TiO_2$ | 62.0 |
| Petroleum coke | 37.7 |
| Sawdust | 0.3 |
|  | 100.0 |

The charge was mixed and loaded in the manner same as in Example A and run was conducted in the same manner in the same furnace as in Example A.

The product consisted of friable blocks, black in color and having approximately the following composition:

|  | Per cent |
|---|---|
| Titanium (calculated as Ti) | 69.00 |
| Carbon (calculated as C) | 19.00 |
| Iron (calculated as Fe) | 0.10 |
| Silicon (calculated as Si) | 0.10 |
| Balance mainly oxygen | 11.80 |
|  | 100.00 |

This product as will be noted, is quite pure and will be useful material in preparation of various sulphates, chlorides, etc. of titanium.

We claim as our invention:

1. The method of converting rutile or titanium oxide mixed with carbon into a friable, essentially amorphous and chemically reactive titanium compound, which comprises heating said mixture enveloped in an insulating mix in an electric resistance furnace without fusion but with substantial decomposition of the charge into said titanium compound.

2. The method of converting rutile or titanium oxide mixed with carbon into a friable essentially amorphous and chemically reactive titanium compound which comprises heating said mixture enveloped in an insulating mix in an electric resistance furnace between 1700° and 2200° C. without fusion but with substantial decomposition of the charge into said titanium compound.

3. The method of converting rutile or titanium oxide mixed with carbon into a friable, essentially amorphous and chemically reactive titanium compound, which comprises heating said mixture enveloped in a carbonaceous reducing agent in an electric resistance furnace without fusion but with substantial decomposition of the charge into said titanium compound.

4. The method of converting rutile or titanium oxide mixed with carbon into a friable, essentially amorphous and chemically reactive titanium compound, which comprises heating said mixture enveloped in a carbonaceous reducing agent in an electric resistance furnace between 1700° and 2200° C. without fusion but with substantial decomposition of the charge into said titanium compound.

5. The method of converting rutile or titanium oxide mixed with carbon into a friable, essentially amorphous and chemically reactive titanium compound, which comprises heating said mixture enveloped in an insulating mix containing coke, sand and sawdust in an electric resistance furnace without fusion but with substantial decomposition of the charge into said titanium compound.

6. The method of converting rutile or titanium oxide mixed with petroleum coke and sawdust into titanium carboxide which comprises heating said mixture enveloped in an insulating mix in an electric resistance furnace without fusion but with substantial decomposition of the charge to form said titanium carboxide.

7. The method of converting rutile or titanium oxide mixed with petroleum coke and sawdust into titanium carboxide which comprises heating said mixture enveloped in an insulating mix in an electric resistance furnace between 1700° and 2200° C. without fusion but with substantial decomposition of the charge to form said titanium carboxide.

8. The method of making titanium carboxide, which comprises heating rutile mixed with a carbonaceous reducing agent and enveloped in a mix of silica sand, coke and sawdust in an electric resistance furnace without fushion but with substantial decomposition of said charge into titanium carboxide.

9. The method of making titanium carboxide, which comprises heating rutile mixed with a carbonaceous reducing agent and enveloped in a mix of silica sand, coke and sawdust in an electric resistance furnace between 1700° and 2200° C. without fusion but with substantial decomposition of said charge into titanium carboxide.

10. The method of making titanium carboxide, which comprises heating titanium oxide mixed with a carbonaceous reducing agent and enveloped in a mix of silica sand, coke and sawdust in an electric resistance furnace without fusion but with substantial decomposition of said charge into titanium carboxide.

11. The method of making titanium carboxide, which comprises heating titanium oxide mixed with a carbonaceous reducing agent and enveloped in a mix of silica sand, coke and sawdust in an electric resistance furnace between 1700° and 2200° C. without fushion but with substantial decomposition of said charge into titanium carboxide.

12. The method of making titanium carboxide, which comprises heating ground rutile mixed with a ground carbonaceous reducing agent and enveloped in a mix of silica sand, coke and sawdust in an electric resistance furnace without fusion but with substantial decomposition of said charge into titanium carboxide.

13. In the method of making titanium carboxide from titanium oxide, the steps which comprise calcining said titanium oxide to about 1400° C. to obtain a semi-vitrified mass, and then heating said mass mixed with carbon and enveloped in an insulating mix in an electric resistance furnace without fusion but with substantial decomposition of said charge into titanium carboxide.

14. In the method of making titanium carboxide from titanium oxide, the steps which comprise calcining said titanium oxide to about 1400° C. to obtain a semi-vitrified mass, and then heating said mass mixed with carbon and enveloped in an insulating mix in an electric resistance furnace between 1700° and 2200° C. without fusion but with substantial decomposition of said charge into titanium carboxide.

15. A friable, essentially amorphous and chemically reactive titanium compound containing a preponderating amount of titanium with lesser amounts of carbon and oxygen with relatively small percentages of iron and silicon.

16. A titanium carboxide containing titanium, carbon and oxygen probably having the structural formula ($Ti_2OC_2$), and characterized as being a friable amorphous spongy material, black in color, and readily reactive with chemical agents.

17. A friable, essentially amorphous and chemically reactive titanium compound containing the following elements in percentage proportions viz: titanium 67 to 69%; carbon 19 to 22%; oxygen 7 to 12%; iron 0.10 to 4%; and silicon 0.10 to 0.50%.

18. Titanium carboxide having presumably the formula $Ti_2OC_2$.

19. A friable, essentially amorphous and chemically reactive titanium compound composed preponderatingly of titanium with lesser amounts of carbon and oxygen, a small percentage of iron and less than ½ of 1% silicon.

CHARLES J. KINZIE.
DONALD S. HAKE.